United States Patent [19]
Gonikberg et al.

[11] Patent Number: 5,864,545
[45] Date of Patent: Jan. 26, 1999

[54] SYSTEM AND METHOD FOR IMPROVING CONVERGENCE DURING MODEM TRAINING AND REDUCING COMPUTATIONAL LOAD DURING STEADY-STATE MODEM OPERATIONS

[75] Inventors: Mark Gonikberg, Santa Clara; Haixiang Liang, San Jose, both of Calif.

[73] Assignee: Altocom, Inc., Mountain View, Calif.

[21] Appl. No.: 761,405

[22] Filed: Dec. 6, 1996

[51] Int. Cl.[6] .................................................. H04B 3/20
[52] U.S. Cl. .................... 370/286; 370/287; 379/406; 379/410; 375/231; 375/232; 375/234
[58] Field of Search .................... 370/286, 289, 370/290, 292, 293, 296, 276, 287; 375/231, 232, 233, 234, 229; 379/406, 410, 407, 411

[56] References Cited

U.S. PATENT DOCUMENTS

| | | | |
|---|---|---|---|
| 4,539,689 | 9/1985 | Chiu et al. | 375/13 |
| 4,713,817 | 12/1987 | Wei | 371/43 |
| 4,756,007 | 7/1988 | Qureshi et al. | 375/37 |
| 4,775,995 | 10/1988 | Chapman et al. | 379/58 |
| 4,813,073 | 3/1989 | Ling | 379/410 |
| 4,931,250 | 6/1990 | Greszczuk | 375/8 |
| 5,007,047 | 4/1991 | Sridhar et al. | 370/32.1 |
| 5,048,054 | 9/1991 | Eyuboglu et al. | 375/8 |
| 5,048,056 | 9/1991 | Goldstein | 375/39 |
| 5,150,381 | 9/1992 | Forney, Jr. et al. | 375/39 |
| 5,163,044 | 11/1992 | Golden | 370/286 |
| 5,265,151 | 11/1993 | Goldstein | 379/97 |
| 5,291,520 | 3/1994 | Cole | 375/34 |
| 5,353,305 | 10/1994 | Fukuda et al. | 375/13 |

(List continued on next page.)

OTHER PUBLICATIONS

ITU–T Recommendation V.34, *A Modem Operating at Data Signalling Rates of up to 28 800 bits/s for Use on the General Switched Telephone Network and on Leased Point–to–Point 2–Wire Telephone–Type Circuits*, Sep. 1994 (previously CCITT Recommendation).

Fuyn Ling & Shahid U. H. Qureshi, *Convergence and Steady–State Behavior of a Phase–Splitting Fractionally Spaced Equalizer*, IEEE Trans. Commun., vol. 38, No. 4, pp. 418–425 (Apr. 1990).

*Primary Examiner*—Dang Ton
*Assistant Examiner*—Phirin Sam
*Attorney, Agent, or Firm*—Zagorin, O'Brien & Graham, LLP

[57] ABSTRACT

A phase-splitting T/3 equalizer and echo canceller structure is computationally efficient because only one point per baud is calculated. However, there are two drawbacks to the structure: (1) since the equalizer performs both the phase-splitting function and channel response equalization, its convergence is slow, and (2) when training the echo canceller during half-duplex training, an answering modem needs an assumed equalizer in its receive path to train its echo canceller, because the adaptive equalizer has not yet been trained; however, after equalizer training the echo canceller needs to be retrained because equalizer coefficients have changed. In contrast, a fixed phase splitting filter can be used during training. The echo canceller and equalizer are each trained with the fixed phase splitting filter thereby improving convergence performance, and after training, the equalizer is convolved with the fixed phase splitting filter to provide the combined phase splitting equalizer and the equalizer is convolved with the echo canceller to provide the combined echo canceller. In this way, computational load is small in steady state and convergence is fast during training. Even though the convergence rate is slower in data mode, it suitable for tracking line variations. An advantage of the transformation from the training structure to the steady-state structure is that a modem or system exploiting the technique provides improved convergence during training while reducing computational load during full-duplex operations. Half-duplex applications, i.e., modem or system operations without echo cancellation, similarly benefit from improved convergence during training and reduced computational load during steady-state operations.

34 Claims, 10 Drawing Sheets

U.S. PATENT DOCUMENTS

| | | | |
|---|---|---|---|
| 5,406,552 | 4/1995 | Long et al. | 370/32.1 |
| 5,428,604 | 6/1995 | Fuda | 370/292 |
| 5,428,641 | 6/1995 | Long | 375/295 |
| 5,465,273 | 11/1995 | Cole | 375/261 |
| 5,517,527 | 5/1996 | Yu | 375/233 |
| 5,566,167 | 10/1996 | Duttweiler | 370/290 |
| 5,642,379 | 6/1997 | Bremer | 370/528 |
| 5,699,423 | 12/1997 | Yoshida et al. | 379/406 |

SYSTEM AND METHOD FOR IMPROVING CONVERGENCE DURING MODEM TRAINING AND REDUCING COMPUTATIONAL LOAD DURING STEADY-STATE MODEM OPERATIONS

BACKGROUND OF THE INVENTION

1. Field of the Invention

This invention relates to modems, and in particular to training of adaptive structures of a modem.

2. Description of the Relevant Art

Modems are communications devices which employ digital modulation techniques to transmit binary data over analog band-limited communications channels, e.g., telephone lines. Typically, two modems communicate over a single channel, with one modem at each end of the channel. Because the channel exhibits distortion, i.e., non-linear frequency response, equalization is typically employed to compensate for channel impairments, such as amplitude and phase distortion. Additionally, since communication typically occurs in both directions (assuming full-duplex operation), some method of channel separation is typically provided. One method common in modern high speed modems is echo cancellation. In full duplex mode, some of the signal transmitted by a first modem feeds back to the receiver side of the first modem where it appears as a near-end echo signal. In addition, because impedance mismatches in the transmission line are inevitable, some of the first modem's transmitted signal is reflected back from the second modem (and any other points of impedance mismatch) to the first modem as far-end echo. The combination of near- and far-end echo at the first modem's receiver interferes with the signal received from the second modem. An echo canceller operates by creating an approximation of the near- and far-end echo for subtraction from the received signal.

Both equalization and echo cancellation are typically provided by adaptive filter structures which, in traditional modem implementations, are implemented using a custom Digital Signal Processor (DSP) to implement discrete-time filters. Modems incorporating equalization and echo cancellation typically conform to international standards to ensure interoperability with modems from other manufacturers. One such standard is the V.34 specification described in ITU-T Recommendation V.34, *A Modem Operating at Data Signalling Rates of up to 28 800 bits/s for Use on the General Switched Telephone Network and on Leased Point-to-Point 2-Wire Telephone-Type Circuits*, dated September, 1994 (previously CCITT Recommendation V.34), which is hereby incorporated herein, in its entirety, by reference.

A fractionally spaced equalizer (FSE) usually outperforms a symbol rate equalizer (SRE) due to the FSE's insensitivity to receiver sampling phase. The FSE can be implemented as a passband (or baseband) equalizer following a phase splitter which converts the real received sequence into a complex sequence for input to the FSE. A variant of the phase-splitter/ FSE structure combines the functions of both a phase-splitter and an FSE into one structure, thereby allowing a more efficient implementation which introduces less system delay than the phase-splitter followed by the FSE. This combined structure is known as a phase-splitting FSE (or PS-FSE). See generally, Ling & Qureshi, *Convergence and Steady-State Behavior of a Phase-Splitting Fractionally Spaced Equalizer*, IEEE TRANS. COMMUN., Vol. 38, No. 4, pp. 418–25 (April 1990). Unfortunately, although the PS-FSE is computationally more efficient than a complex FSE (CFSE), the PS-FSE converges less quickly than an SRE or CFSE.

SUMMARY OF THE INVENTION

A phase-splitting fractionally-spaced equalizer is a computationally efficient structure for channel impairment compensation during half- and full-duplex modem operations. A combined structure including the phase-splitting fractionally-spaced equalizer and echo cancellation at the equalizer output is computationally efficient for full-duplex modem operations. However, both the phase-splitting fractionally-spaced equalizer itself and in combination with an echo canceller have drawbacks which affect their desirability during training. First, because the phase-splitting fractionally-spaced equalizer structure performs both the phase-splitting function and channel response equalization, its convergence is slow. Second, if the echo canceller of the combined structure is to be trained before the equalizer (e.g., in the case of an answering modem), an assumed equalizer needs to be inserted in the modem receive path to train the echo canceller. Equalizer training follows; however, the echo canceller must then be retrained because the equalizer has changed.

These shortcomings can be overcome by providing a precursor training structure which has improved convergence characteristics and which eliminates an assumed equalizer from the echo canceller training receive path. In particular, a fixed phase splitting filter, an echo canceller and an equalizer are used during training. The echo canceller and equalizer are each trained with the fixed phase splitting filter thereby improving convergence performance. After training, the equalizer is convolved with the fixed phase splitting filter to provide the combined phase splitting equalizer and the equalizer is convolved with the echo canceller to provide the combined echo canceller. In this way, computational load is small in steady state and convergence is fast during training. Even though the convergence rate is slower in data mode, it is suitable for tracking line variations. An advantage of the technique is that a modem or system exploiting it provides improved convergence during training while reducing computational load during full-duplex operations. Half-duplex applications, i.e., modem or system operations without echo cancellation, similarly benefit from improved convergence during training and reduced computational load during steady-state operations.

In an embodiment in accordance with the present invention, a method for training echo canceller and equalizer structures of a modem includes providing a half duplex training structure which includes an adaptive phase-splitting echo canceller coupled to receive transmit-path samples, a phase splitting filter coupled to receive receive-path samples, and an adaptive complex equalizer coupled to the phase-splitting echo canceller and the phase splitting filter to receive a first difference between outputs thereof. The method further includes training the phase-splitting echo canceller using the first difference, decoupling the complex equalizer from the transmit path and thereafter training the complex equalizer using a second difference between an output of the complex equalizer and a reference; and convolving the trained phase-splitting echo canceller with the trained complex equalizer and convolving the phase splitting filter with the trained complex equalizer to define a trained full-duplex structure. The trained full-duplex structure includes a trained phase-splitting echo canceller coupled to receive transmit-path samples and a trained phase-splitting equalizer coupled to receive receive-path samples.

In another embodiment in accordance with the present invention, a modem includes a phase splitting filter, a first phase splitting T/3 echo canceller, a complex T/3 equalizer, a second phase splitting T/3 echo canceller, and a phase-splitting T/3 equalizer. The phase splitting filter is coupled into a receive path of the modem. The first phase splitting T/3 echo canceller is coupled between transmit and receive path of the modem during a transmit-only phase of half-duplex training. Coefficients of the first phase splitting T/3 echo canceller are updated during the transmit-only phase to minimize a first difference between outputs of the phase splitting filter and the first phase splitting T/3 echo canceller. The complex T/3 equalizer is coupled into the receive path during a receive-only phase of half-duplex training. Coefficients of the complex T/3 equalizer are updated during the receive-only phase to minimize a second difference between the output of the complex T/3 equalizer and a reference. The second phase splitting T/3 echo canceller and the phase-splitting T/3 equalizer are coupled into the receive path during full-duplex operations. The second phase splitting T/3 echo canceller is defined by convolution of respective coefficients of the first phase splitting T/3 echo canceller and the complex T/3 equalizer coincident with a cut-over to full-duplex operations. The phase-splitting T/3 equalizer is defined by convolution of respective coefficients of the phase splitting filter and the complex T/3 equalizer coincident with the cut-over to full-duplex operations. In a various further embodiments, the modem is implemented custom circuitry, using a programmed custom (or commercially-available) DSP, as software executable on a general purpose processor, or as any combination of the above.

In yet another embodiment in accordance with the present invention, an apparatus includes a half-duplex training structure (including adaptive phase-splitting fractionally-spaced echo canceller means, phase splitting filter means; and adaptive complex fractionally-spaced equalizer means), means for training the adaptive phase-splitting fractionally-spaced echo canceller means during a transmit only phase of half-duplex training, means for training the adaptive complex fractionally-spaced equalizer means during a receive only phase of half-duplex training, and means for converting the half-duplex training structure to a full-duplex structure. The converting means converting the half-duplex training structure to a full-duplex structure by convolving trained coefficients of the adaptive phase-splitting fractionally-spaced echo canceller means with trained coefficients of the adaptive complex fractionally-spaced equalizer means to define trained phase-splitting fractionally-spaced echo canceller means, and by convolving trained coefficients of the phase splitting filter means with trained coefficients of the adaptive complex fractionally-spaced equalizer to define trained phase-splitting fractionally-spaced equalizer means.

BRIEF DESCRIPTION OF THE DRAWINGS

The present invention may be better understood, and its numerous objects, features, and advantages made apparent to persons of ordinary skill in the art by referencing the accompanying drawings.

FIG. 2A depicts real and complex data flows associated with echo canceller training. FIG. 2B depicts real and complex data flows associated with equalizer training.

FIG. 5A depicts real and complex data flows associated with echo canceller training in accordance with an exemplary embodiment of the present invention. FIG. 5B depicts real and complex data flows associated with equalizer training in accordance with an exemplary embodiment of the present invention.

The use of the same reference symbols in different drawings indicates similar or identical items.

DESCRIPTION OF THE PREFERRED EMBODIMENT(S)

Figure 1:
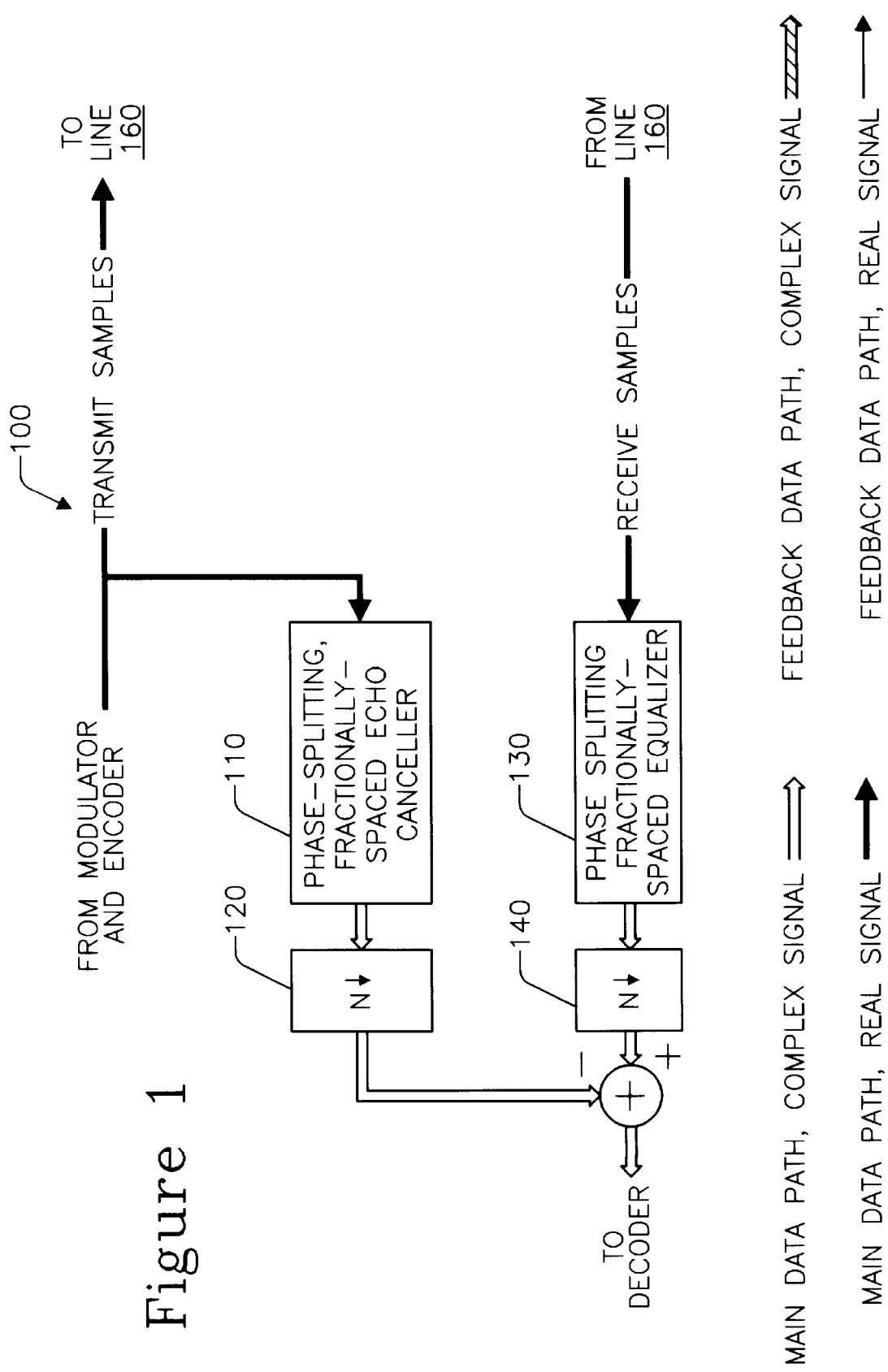
FIG. 1 is a block diagram of a phase-splitting, fractionally-spaced echo canceller and phase-splitting, fractionally-spaced equalizer structure indicating real and complex data flows for compensating for communications channel impairments.

FIG. 1 depicts a channel impairment compensation and separation structure 100 for a modem. Channel impairment compensation and separation structure 100 includes phase splitting, fractionally-spaced echo canceller 110 and phase-splitting, fractionally-spaced equalizer 130. Transmit signals from encoder and modulator modules (not shown) are supplied to phase-splitting, fractionally-spaced echo canceller 110. Phase-splitting, fractionally-spaced echo canceller supplies an echo replica of the transmit signal which is subtracted from the equalized output of phase-splitting fractionally-spaced equalizer 130. The resulting complex echo cancelled, equalized receive signal is supplied to a decoder module (not shown). Both phase-splitting, fractionally-spaced echo canceller 110 and phase-splitting fractionally-spaced equalizer 130 are implemented as complex adaptive filters with downsampled outputs. Illustratively, downsampling is depicted at the respective outputs of phase-splitting, fractionally-spaced echo canceller 110 and phase-splitting fractionally-spaced equalizer 130, i.e., as downsamplers 120 and 140, although downsampling may be provided integrally with the respective filter implementations of phase-splitting, fractionally-spaced echo canceller 110 and phase-splitting fractionally-spaced equalizer 130.

As described in Ling & Qureshi, *Convergence and Steady-State Behavior of a Phase-Splitting Fractionally Spaced Equalizer*, a phase-splitting fractionally-spaced equalizer usually outperforms (in terms of number of operations required) both a Symbol Rate Equalizer (SRE) and a complex Fractionally Spaced Equalizer (FSE) though with a slower convergence rate. Although the computational efficiency and reduced system delay associated with a phase-splitting fractionally-spaced equalizer are desirable during modem communications, the slower convergence of phase-splitting fractionally-spaced equalizer 130 is a drawback during modem training.

Figure 2A:
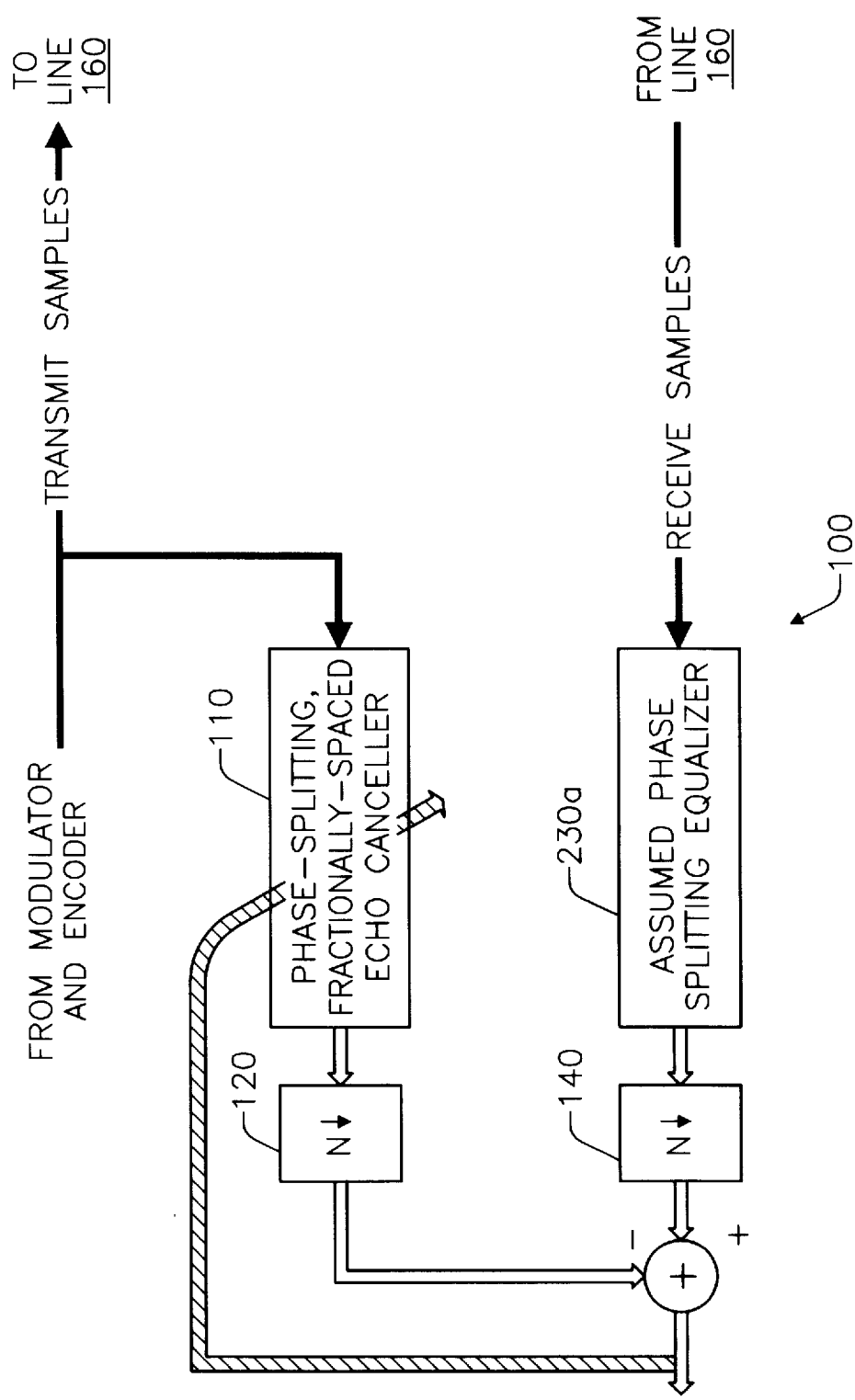
FIGS. 2A and 2B are block diagrams depicting training of adaptive structures of FIG. 1. In particular.
Figure 2B:
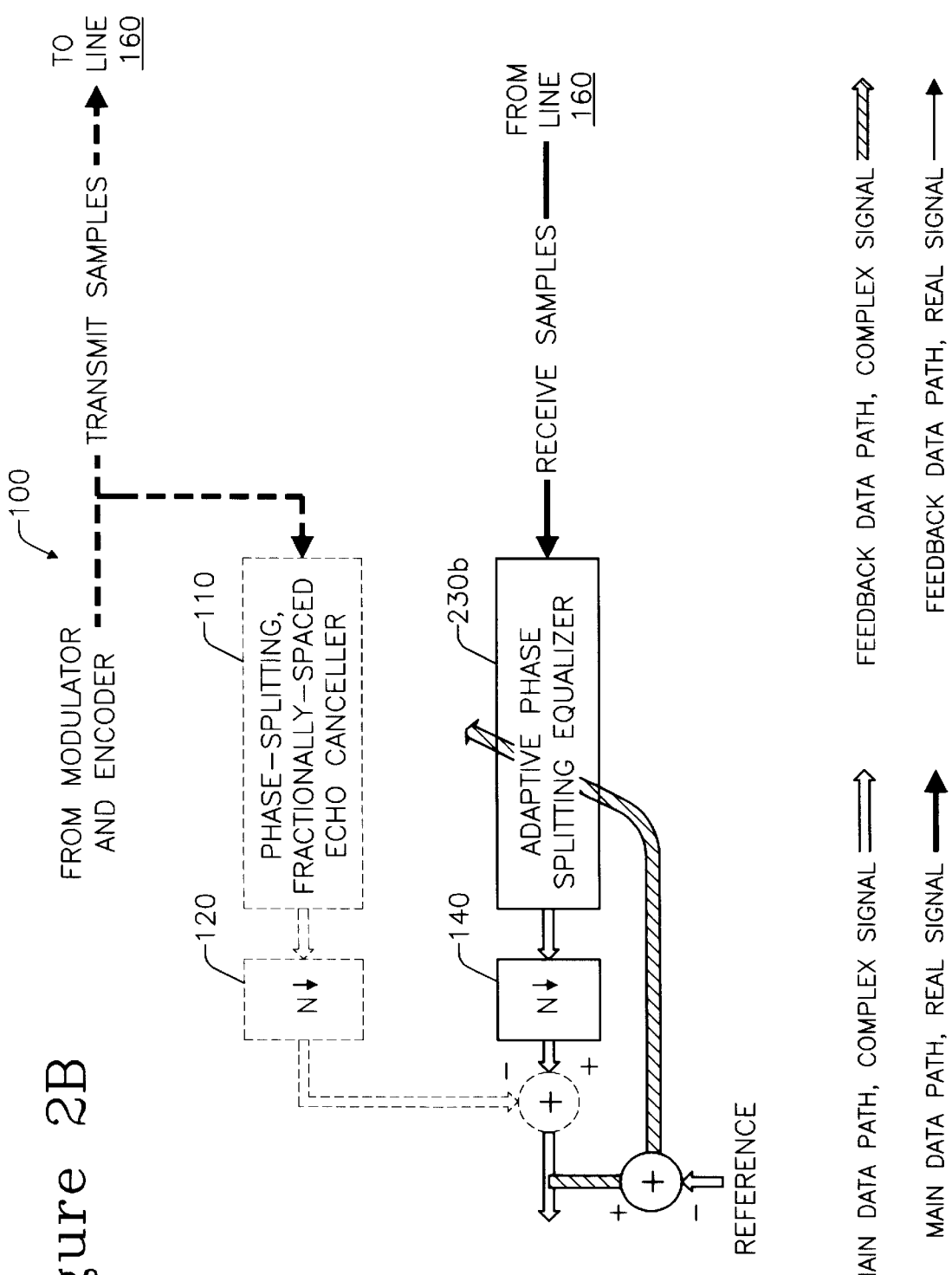

Channel impairment compensation and separation structure 100 of FIG. 1 has an additional disadvantage during half-duplex modem training which may be illustrated in the context of FIGS. 2A and 2B. FIG. 2A depicts echo canceller training during a transmit-only phase of half-duplex training. An assumed (non-adaptive) instance of phase-splitting fractionally-spaced equalizer 130 (i.e., assumed phase-splitting equalizer 230a) is provided along the receive path. However, since assumed phase-splitting equalizer 230a is not trained to actual line conditions, it is a poor compensator for distortion on line 160. As a result, during a transmit-only phase of half-duplex training, coefficients for assumed phase-splitting equalizer 230a are, at best, an initial estimate. Phase-splitting, fractionally-spaced echo canceller 110 is trained by adjusting the coefficients thereof to drive the difference between the received (and poorly equalized) signal and the echo replica signal generated by phase-splitting, fractionally-spaced echo canceller 110 to zero. Because phase-splitting, fractionally-spaced echo canceller 110 training is based on assumed, rather than actual, line conditions, phase-splitting, fractionally-spaced echo canceller 110 will likely need to be retrained after adaptive phase splitting equalizer 230b (see FIG. 2B) is trained to actual line conditions.

FIG. 2B depicts an adaptive instance of phase-splitting fractionally-spaced equalizer 130 (i.e., adaptive phase splitting equalizer 230b) which is trained during a receive-only phase of half-duplex training. During equalizer training, the transmit path of the modem is inactive and equalizer training is accomplished using a reference signal received along the receive path from a remote modem. In particular, adaptive phase splitting equalizer 230b is trained by adjusting the coefficients thereof to drive the difference between the received signal and a locally generated reference to zero.

Once adaptive phase splitting equalizer 230b is trained, the coefficients for phase-splitting, fractionally-spaced echo canceller 110 no longer represent a valid replica of the echo path because phase-splitting, fractionally-spaced echo canceller 110 coefficients were calculated with an assumed phase-splitting equalizer 230a defined by initial guess coefficients in the receive path.

Further training of phase-splitting, fractionally-spaced echo canceller 110 during a full-duplex phase of training allows for adjustment of phase-splitting, fractionally-spaced echo canceller 110 coefficients to represent a valid replica of the echo path now including a trained adaptive phase splitting equalizer 230b. However, echo canceller training is complicated by the fact that the transmit-only (and therefore echo-only) portion half-duplex training is over and signal on line 160 includes signals transmitted by both local and remote modems.

Because of the lower convergence rate of phase-splitting fractionally-spaced equalizer 130 and the above-described training disadvantages, structures such as channel impairment compensation and separation structure 100 are not commonly used despite the performance benefits of phase-spitting fractionally-spaced adaptive structures.

During the transmit-only phase of half-duplex training a local modem incorporating channel impairment compensation and separation structure 100 of FIGS. 1, 2A and 2B transmits and a remote modem coupled to an opposite end of transmission line 160 is silent. Correspondingly, during the receive-only phase of half-duplex modem training, the remote modem transmits a reference signal on transmission line 160 and the local modem is silent. During a third, full-duplex, phase of training both transmit and receive portions of the local and remote modems are active. For a more detailed description of exemplary training sequences, see ITU-T Recommendation V.34, *A Modem Operating at Data Signalling Rates of up to 28 800 bits/s for Use on the General Switched Telephone Network and on Leased Point-to-Point 2-Wire Telephone-Type Circuits*, dated September, 1994 (previously CCITT Recommendation V.34), Section 10 of which (Start-up Signals and Sequences) is hereby incorporated by reference.

Figure 3:
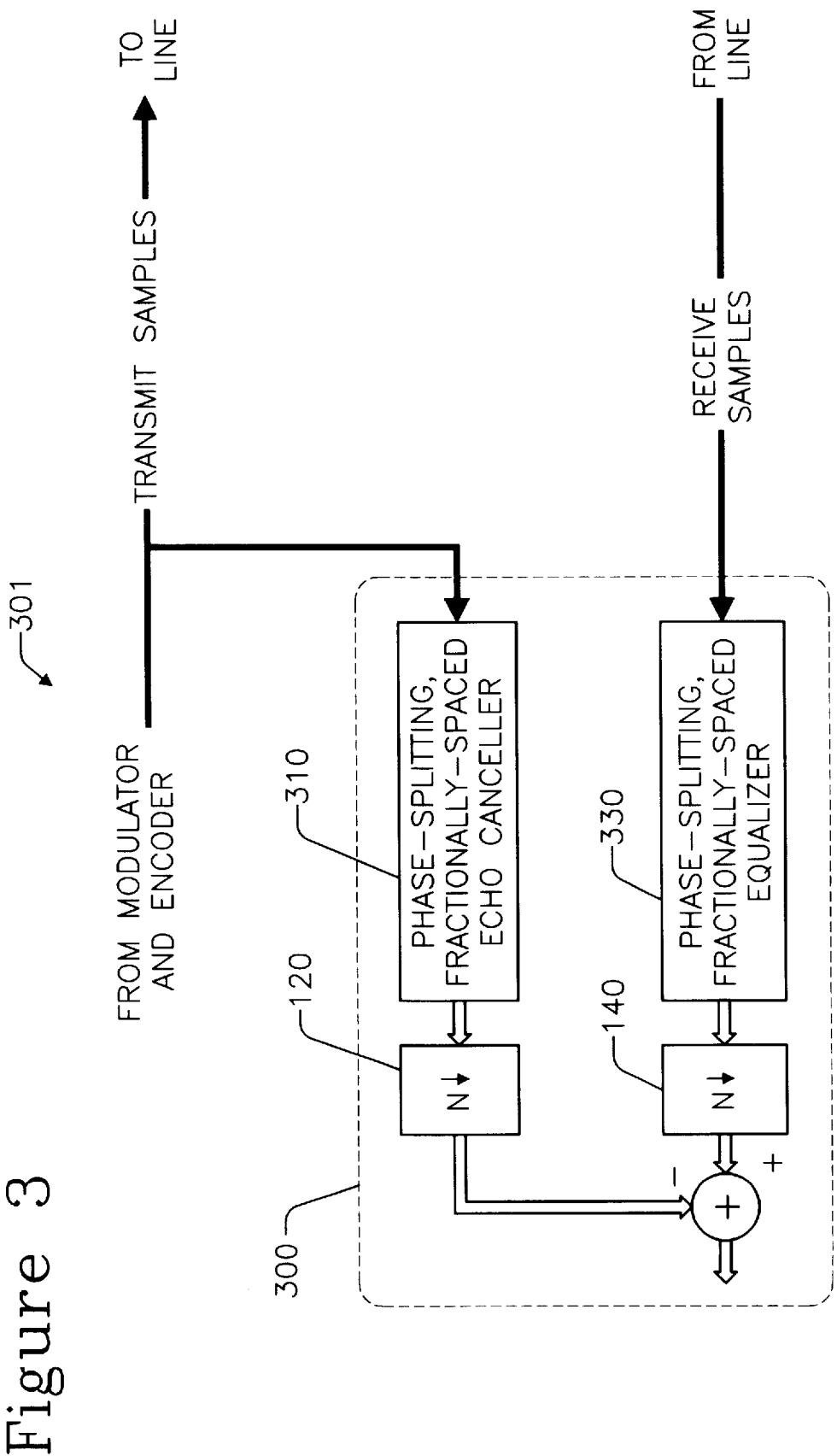
FIG. 3 is a block diagram of a phase-splitting, fractionally-spaced echo canceller and phase-splitting, fractionally-spaced equalizer structure for compensating for communications channel impairments during full-duplex operations in accordance with an exemplary embodiment of the present invention.
Figure 4:
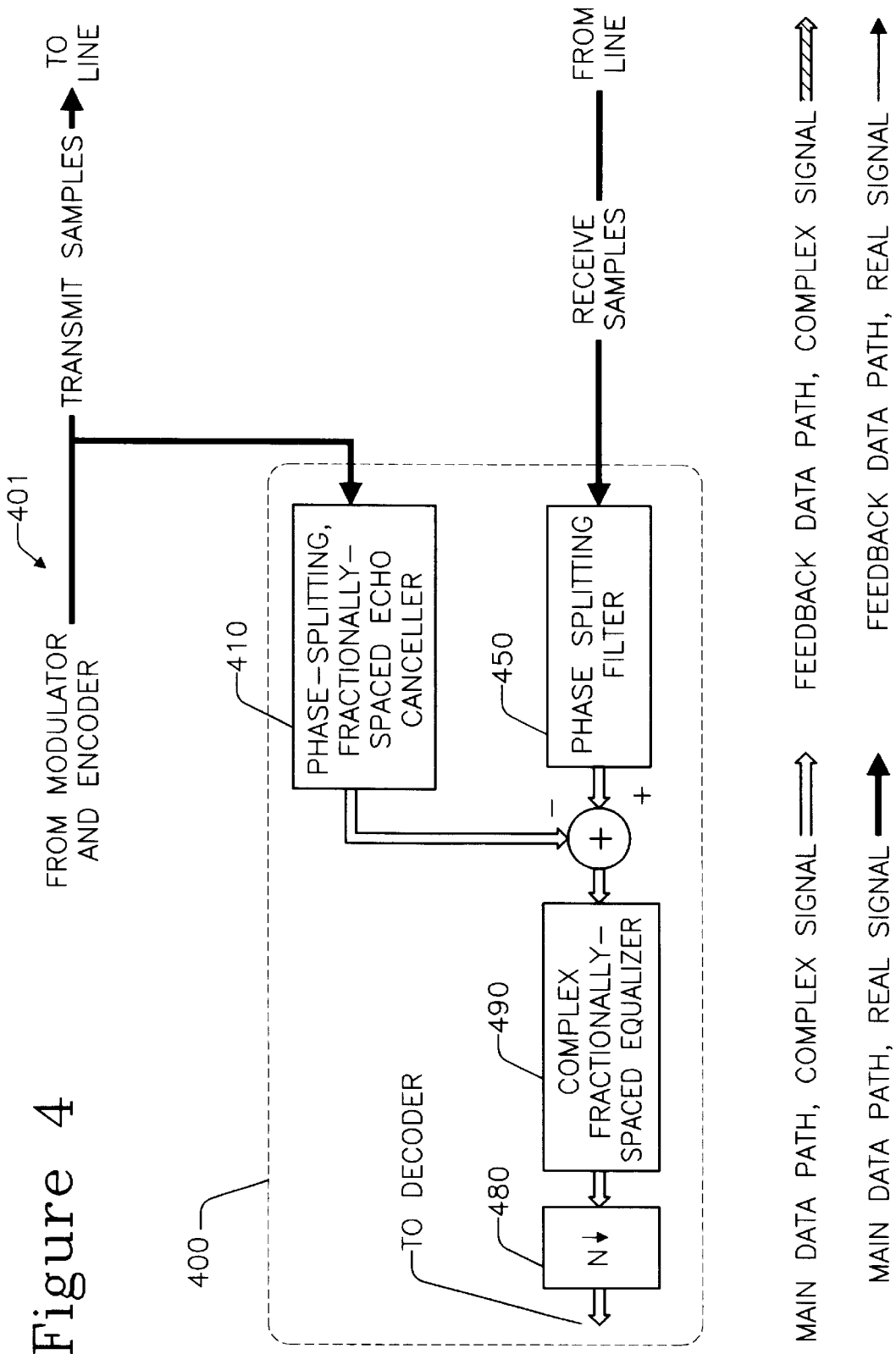
FIG. 4 is a block diagram of a half-duplex training structure including adaptive echo canceller and equalizer structures for compensating for communications channel impairments in accordance with an exemplary embodiment of the present invention.

FIGS. 3 and 4 depict respective configurations (301 and 401) of a channel impairment compensation and separation structure which, in a full-duplex operational configuration, includes an adaptive fractionally-spaced echo canceller and equalizer structure 300, and, in a half-duplex training configuration, includes a precursor structure (i.e., half-duplex training structure 400). Referring to FIG. 3, configuration 301 includes a phase-splitting fractionally-spaced echo canceller 310 and a phase splitting fractionally spaced equalizer 330. Transmit signals from encoder and modulator modules (not shown) are supplied to echo canceller 310. Echo canceller 310 supplies an echo replica of the transmit signal which is subtracted from the equalized output of phase-splitting fractionally-spaced equalizer 330.

The resulting complex echo cancelled, equalized receive signal is supplied to a decoder module (not shown) in a typical modem configuration. Both phase-splitting fractionally-spaced echo canceller 310 and phase-splitting fractionally-spaced equalizer 330 are implemented as complex adaptive filters with downsampled outputs. Illustratively, downsampling is depicted at the respective outputs of phase-splitting fractionally-spaced echo canceller 310 and phase-splitting fractionally-spaced equalizer 330; however, downsampling can be provided by filter implementations of phase-splitting fractionally-spaced echo canceller 310 and phase-splitting fractionally-spaced equalizer 330.

Although adaptive fractionally-spaced echo canceller and equalizer structure 300 exhibits some of the same convergence rate and training problems described above with reference to FIGS. 2A and 2B, these shortcomings are addressed by providing half-duplex training structure 400 as shown in FIG. 4. Half-duplex training structure 400 includes a phase-splitting fractionally-spaced echo canceller 410, a fixed (non-adaptive) phase splitting filter 450, and a complex fractionally-spaced equalizer 490. A difference between outputs of phase-splitting fractionally-spaced echo canceller 410 and phase splitting filter 450 is supplied to complex fractionally-spaced equalizer 490. In this way, the two adaptive structures, i.e., phase-splitting fractionally-spaced echo canceller 410 and complex fractionally-spaced equalizer 490, can be decoupled during transmit-only and receive-only phases of half-duplex training as now described below with reference to FIGS. 5A and 5B.

Figure 5A:
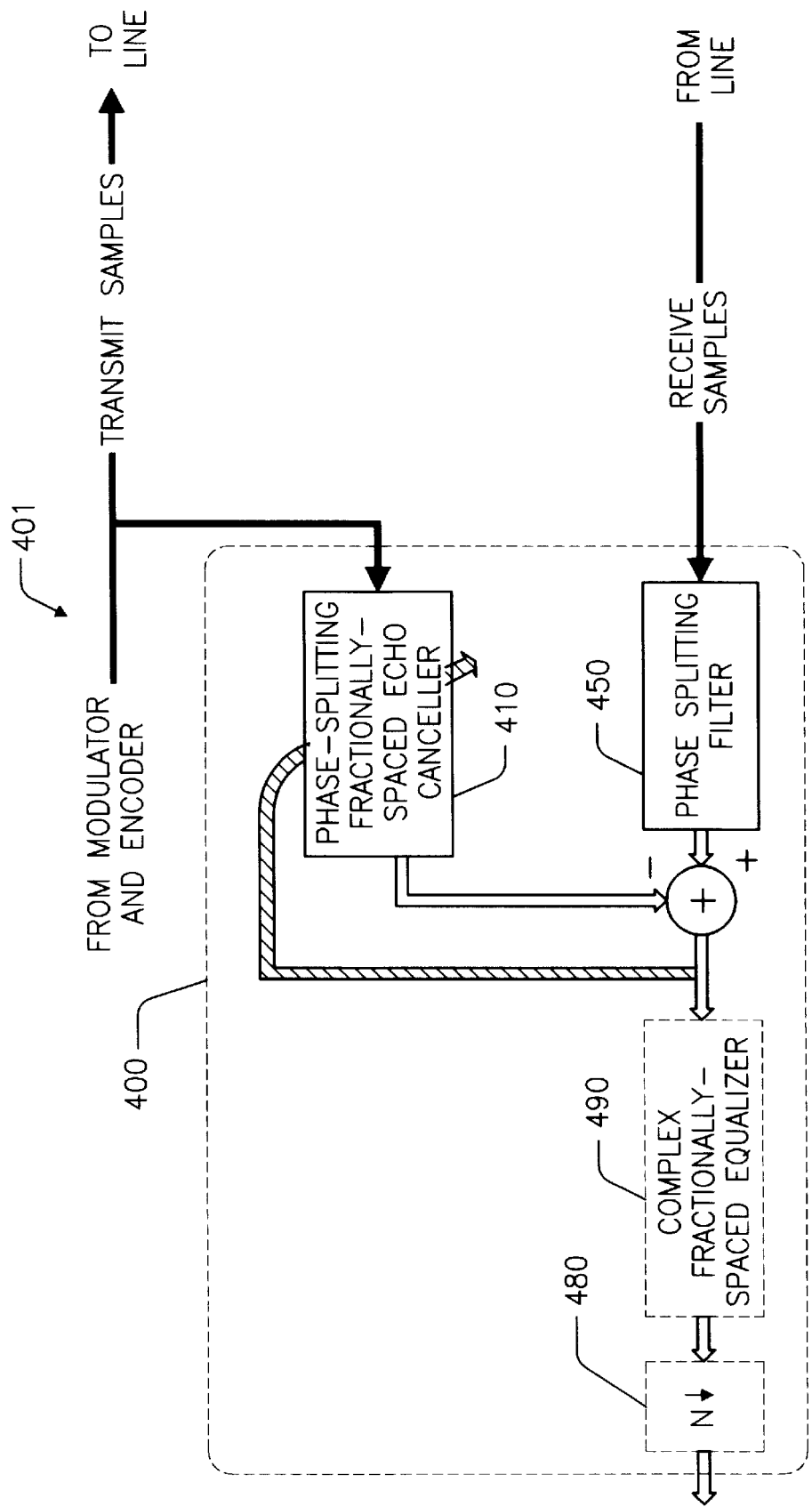
FIGS. 5A and 5B are block diagrams depicting training of adaptive structures of FIG. 4. In particular.

FIG. 5A depicts real and complex data flows associated with echo canceller training during a transmit-only phase of half-duplex training. In particular, during the transmit-only phase of half-duplex training, complex fractionally-spaced equalizer 490 need not be coupled into half-duplex training structure 400 and phase-splitting fractionally-spaced echo canceller 410 is trained by adjusting the coefficients thereof to drive the difference between the phase split receive signal and the echo replica signal generated by phase-splitting fractionally-spaced echo canceller 410 to zero. Unlike the structure of FIG. 2A, an untrained equalizer (e.g., complex fractionally-spaced equalizer 490) does not taint the training of phase-splitting fractionally-spaced echo canceller 410.

Figure 5B:
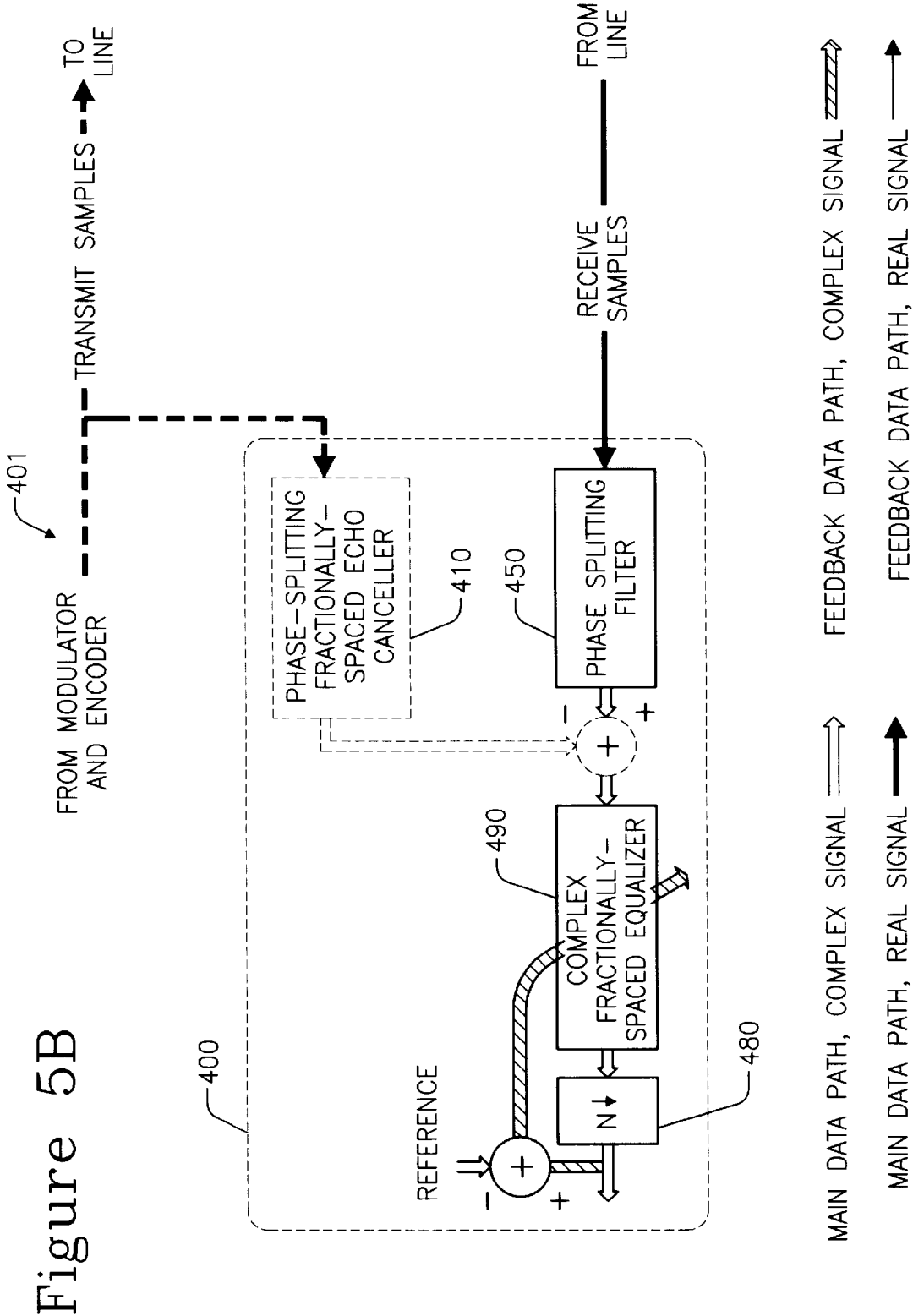

FIG. 5B depicts real and complex data flows associated with equalizer training during a receive-only phase of half-duplex training. In particular, during the receive-only phase of half-duplex training, the echo replica path (which includes phase-splitting fractionally-spaced echo canceller 410) need not be coupled into half-duplex training structure 400 and complex fractionally-spaced equalizer 490 is trained by adjusting the coefficients thereof to drive the difference between the received, phase-split, and equalized signal output of complex fractionally-spaced equalizer 490 and a locally generated reference signal to zero. Complex fractionally-spaced equalizer 490 advantageously converges more rapidly than the phase-splitting fractionally-spaced equalizer 130 of FIG. 1.

After training phase-splitting fractionally-spaced echo canceller 410 as shown in FIG. 5A and after training complex fractionally-spaced equalizer 490 as shown in FIG. 5B, the half-duplex training structure 400 is transformed into adaptive fractionally-spaced echo canceller and equalizer structure 300 for full-duplex operations. This transformation is accomplished by:

1. convolving the coefficient vector defining a trained instance of phase-splitting fractionally-spaced echo canceller 410 with the coefficient vector defining a trained instance of complex fractionally-spaced equalizer 490 to define a trained phase-splitting fractionally-spaced echo canceller structure such as phase-splitting fractionally-spaced echo canceller 310; and
2. convolving the coefficient vector defining phase splitting filter 450 with the coefficient vector defining a trained instance of complex fractionally-spaced equalizer 490 to define a trained phase splitting fractionally spaced equalizer structure such as phase splitting fractionally spaced equalizer 330.

An exemplary embodiment of the resulting structure is shown in FIG. 3. In this way, convergence rate and training-related shortcomings of adaptive fractionally-spaced echo canceller and equalizer structure 300 are overcome by the use of a complex fractionally-spaced equalizer structure during half-duplex training and by the fact that no untrained equalizer is in the receive path during echo canceller training. Transition to the phase splitting, fractionally-spaced structures provides a computationally efficient structure for full-duplex communications.

Figure 6:
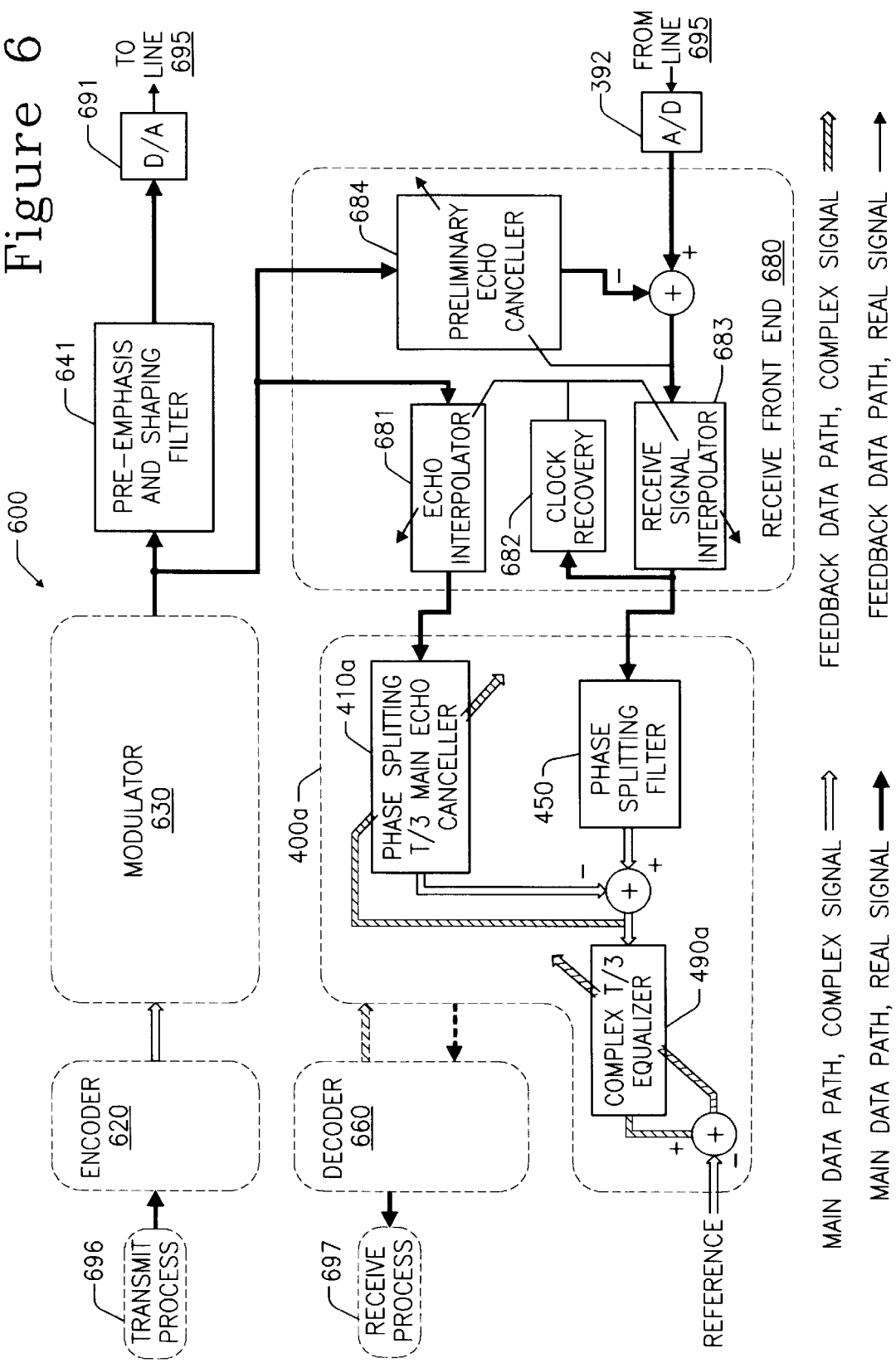
FIG. 6 is a block diagram depicting functional modules and data flows for a modem incorporating half-duplex training structures in accordance with an exemplary embodiment of the present invention.
Figure 7:
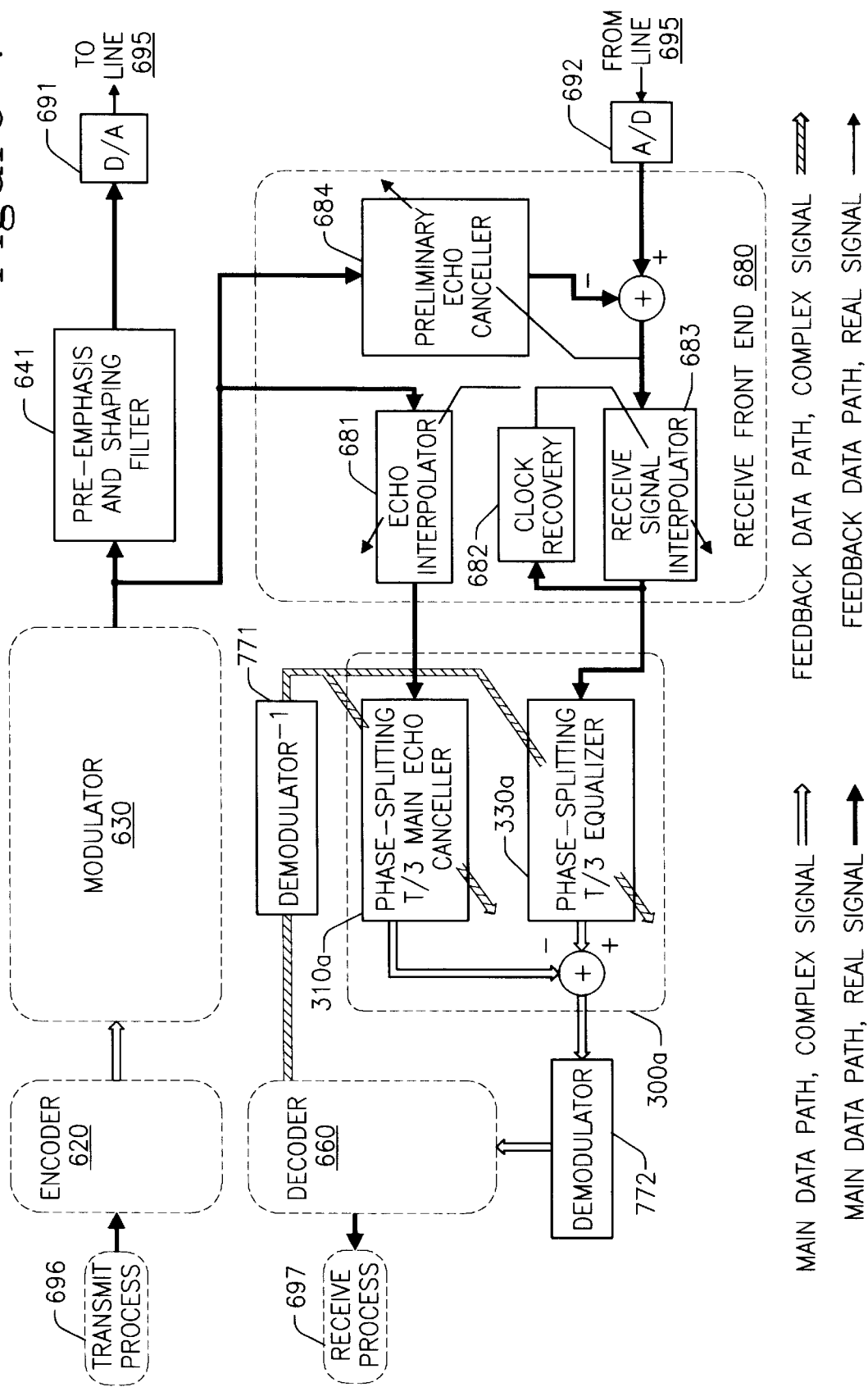
FIG. 7 is a block diagram depicting functional modules and data flows for a modem incorporating full-duplex operational structures in accordance with an exemplary embodiment of the present invention.

FIGS. 6 and 7 respectively depict half-duplex training and full-duplex operational versions of the above described adaptive structures, i.e., half-duplex training structure 400a and adaptive fractionally-spaced echo canceller and equalizer structure 300a, in the context of functional modules and data flows of V.34 modem 600. Although, these adaptive structures are depicted as T/3 structures in FIGS. 6 and 7, alternative fractional (and even non-fractional) spacings are also possible. In addition to a main echo canceller, V.34 modem 600 includes a preliminary echo canceller 684 which performs echo cancellation early in the receive path (e.g., before interpolation, gain, or other preprocessing provided in a receive front-end). Suitable alternative configurations may optionally forgo preliminary echo canceller 684, may bifurcate either or both of preliminary echo canceller 684 and the phase-splitting fractionally-spaced main echo canceller into separate adaptive structures for respectively canceling near- and far-end echo, etc. Suitable modifications will be appreciated by persons of ordinary skill in the art.

V.34 modem 600 includes transmit and receive data paths. The transmit data path includes encoder 620, modulator 630, and pre-emphasis and shaping filter 641. The receive data path includes a receive data module 650, decoder 660, demodulation 670, and receive front end module 680. A transmit process 696 invokes an external data handler with data for transmission over line 695. The structures of FIGS. 6 and 7 may be suitably implemented in custom circuitry, using a programmed custom (or commercially-available) DSP, as software executable on a general purpose processor, or as any combination of the above.

In an exemplary software embodiment, V.34 modem 600 includes an efficient general purpose processor implementation of an FIR filter as described in the described in greater detail in a co-pending patent application entitled, "Efficient Implementation of An FIR Filter on a General Purpose Processor," U.S. patent application Ser. No. 08/748,854. naming Gonikberg and Liang as inventors and filed Nov. 14, 1996, the entirety of which is hereby incorporated by reference. Along the transmit data path, pre-emphasis and shaping filter 641 is implemented using such an FIR filter implementation. Along the receive data path (see FIGS. 6 and 7), echo interpolator 681, receive signal interpolator 683, preliminary echo canceller 684, phase-splitting T/3 main echo canceller 310a, phase splitting T/3 equalizer 330a, phase-splitting T/3 main echo canceller 410a, phase splitting filter 450, and complex T/3 equalizer 490a are also implemented using such an FIR filter.

In an exemplary digital signal processor (DSP) embodiment, pre-emphasis and shaping filter 641, echo interpolator 681, receive signal interpolator 683, preliminary echo canceller 684, phase-splitting T/3 main echo canceller 310a, phase splitting T/3 equalizer 330a, phase-splitting T/3 main echo canceller 410a, phase splitting filter 450, and complex T/3 equalizer 490a using corresponding DSP instruction sequences. Persons of ordinary skill in the art will appreciate suitable DSP instruction sequences and coefficient vector definitions to implement the various filters.

Referring now to the transmit data path of V.34 modem 600, transmit process 696 supplies a bit stream to a V.34 implementation of encoder 620. Encoder 620 converts the input bit stream into a baseband sequence of complex symbols which is used as input to modulator 630. Encoder 620 performs shell mapping, differential encoding, constellation mapping, precoding and 4D trellis encoding, and nonlinear encoding, all as described in respective sections of ITU-T Recommendation V.34, *A Modem Operating at Data Signalling Rates of up to* 28 800 *bits/s for Use on the General Switched Telephone Network and on Leased Point-to-Point* 2-*Wire Telephone-Type Circuits*, dated September, 1994 (previously CCITT Recommendation V.34), which is incorporated herein, in its entirety, by reference. Persons of ordinary skill in the art will recognize variety of alternative implementations of encoder 620 in accordance with the requirements of ITU-T Recommendation V.34 (hereafter the V.34 recommendation). In addition, persons of ordinary skill in the art will recognize a variety of alternative configurations of encoder 620 suitable for modem implementations in accordance with other communications standards such as V.32, V.32bis, etc. Returning to the V.34 embodiment of FIGS. 6 AND 7, encoder 620:

1. converts the input bit stream into a sequence of mapping frames as described in section 9.3 of the V.34 recommendation, which is incorporated herein by reference;

2. performs shell mapping as described in section 9.4 of the V.34 recommendation, which is incorporated herein by reference;
3. performs differential encoding as described in section 9.5 of the V.34 recommendation, which is incorporated herein by reference;
4. performs constellation mapping as described in section 9.1 of the V.34 recommendation, which is incorporated herein by reference;
5. performs preceding and 4D trellis encoding as described in section 9.6 of the V.34 recommendation, which is incorporated herein by reference; and
6. performs nonlinear encoding as described in section 9.7 of the V.34 recommendation, which is incorporated herein by reference.

A variety of suitable implementations in accordance with the requirements of respective sections of the V.34 recommendation will be appreciated by persons of ordinary skill in the art.

Modulator 630 converts the baseband sequence of complex symbols from the output of the encoder into a passband sequence of real samples. In particular, modulator 630:
1. multiplies the complex baseband sequence by the carrier frequency; and
2. converts the complex signal to real.

If the spectrum of the modulator output is sufficiently white, it can be used as an input to receiver echo cancellers, as described below.

Shaping and pre-emphasis filter 641 provides square-root-of-raised-cosine shaping as well as pre-emphasis filtering specified by section 5.4 of the V.34 recommendation, which is incorporated herein by reference. Square-root raised cosine complex shaping and pre-emphasis filtering are implemented using any suitable filter implementation. The output of shaping and pre-emphasis filter 641 is an output of the transmitter portion of V.34 modem 600 is provided to D/A converter 691. D/A converter 691 couples to transmission line 695.

Referring now to the receive data path of V.34 modem 600, receive front end module 680 receives the output of the A/D converter 392 as an input. A/D converter 692 couples to transmission line 695. Preliminary echo canceller 684 is implemented as a real data/real coefficients adaptive filter using any suitable filter implementation. Preliminary echo canceller 684 receives as an input a white signal from the output of the modulator 630. Preliminary echo canceller 684 uses a stochastic gradient updating algorithm for adaptation during half duplex of V.34 training and is not updated during data mode. The purpose of this preliminary stage of echo cancellation is to reduce the echo level relative to the receive signal level so that subsequent stages such as clock recovery, signal detection, and automatic gain control (each not shown) will not be significantly affected by the echo. In the full-duplex structure of FIG. 7, final echo signal cancellation is performed during full-duplex operations by phase-splitting T/3 main echo canceller 310a at the output of phase-splitting T/3 equalizer 330a. Although fractional spacing in the embodiment of FIGS. 6 and 7 is T/3, other fractional spacings (e.g., T/2, T/4, etc.) are also suitable. In addition, although forgoing the performance benefits of fractionally-spaced structures during full-duplex communications, the T/3 structures of echo canceller and equalizer structure 300a (and corresponding precursor structures of half-duplex training structure 400a) may instead be T-spaced.

The modem receiver implemented along the receive data path should be synchronized with the remote modem signal. In the exemplary embodiment of FIGS. 6 and 7, an adaptive FIR filter is used to perform the interpolation. Adaptive FIR filters implemented in any suitable manner (including DSP and general purpose processor alternatives described above) are used to interpolate the receive signal (at receive signal interpolator 683) as well as to interpolate the modulator output (at echo interpolator 681) used as input for phase-splitting T/3 main echo canceller 310a. The filter coefficients are adjusted based on timing phase and frequency recovered from the remote modem signal by clock recovery module 682. The adaptation algorithm is performed by a two-stage combination of a poly-phase filter and linear interpolations. Persons of ordinary skill in the art will appreciate a variety of suitable implementations of poly-phase filters.

Referring to FIG. 6, V.34 modem 600 is shown with half-duplex training structure 400a. Phase-splitting T/3 main echo canceller 410a is trained during a transmit-only phase of half-duplex training and complex T/3 equalizer 490a is trained during a receive-only phase of half-duplex training. Phase-splitting T/3 main echo canceller 410a training and complex T/3 equalizer 490a training are analogous to training described above with reference to FIGS. 5A and 5B.

As analogously described in the context of FIGS. 5A and 5B, a trained instance of phase-splitting T/3 main echo canceller 410a is convolved with a trained instance of complex T/3 equalizer 490a and phase splitting filter 450 with complex T/3 equalizer 490a to define corresponding trained adaptive structures for full duplex operations. Phase-splitting T/3 main echo canceller 410a is convolved with complex T/3 equalizer 490a to define phase-splitting T/3 main echo canceller 310a and phase splitting filter 450 is convolved with complex T/3 equalizer 490a to define phase-splitting T/3 equalizer 330a. As described above, alternative embodiments may exploit separate near- and far-end echo canceller structures. In such a case, corresponding near- and far-end versions of the training echo canceller structure (i.e., of phase-splitting T/3 main echo canceller 410a) would be provided and transition from the training echo canceller structures to corresponding adaptive structures for full duplex operations is analogous.

During half-duplex training (as illustrated in FIG. 6), the output of phase-splitting T/3 main echo canceller 410a is provided at 3T rate in correspondence with the 3T output of phase splitting filter 450. In full-duplex operations (as shown in FIG. 7), phase-splitting T/3 equalizer 330a is used for channel equalization. The input to phase-splitting T/3 equalizer 330a is the output of receive signal interpolator 683 and phase-splitting T/3 equalizer 330a has an input rate of 3T. The output of phase-splitting T/3 equalizer 330a is downsampled by 3 to symbol rate. Phase-splitting T/3 equalizer 330a is implemented using any suitable adaptive filter design. Phase splitting T/3 echo canceller 310a is used to subtract residual echo left over from preliminary echo canceller 684. The echo canceller input is the output signal from modulator 630 synchronized with the remote modem clock using echo interpolator 681. Echo is subtracted at the output of phase-splitting T/3 equalizer 330a and the output is converted to baseband. Demodulator 772 and a corresponding inverse structure (demodulator$^{-1}$ 771) provide adaptive updates to the coefficients defining phase-splitting T/3 main echo canceller 310a and phase-splitting T/3 equalizer 330a. V.34 modem 600 may optionally include a phase locked loop to compensate for frequency offset and phase jitter on transmission line 695.

Decoder 660 converts the demodulated complex symbols into a bit stream which is supplied to receiver process 697. Transmit process 696 and receiver process 697 may be the same process. Decoder 660 performs nonlinear decoding, linear prediction, trellis decoding, constellation decoding, shell demapping, and data deframing, all as described in respective sections of the V.34 recommendation, which is incorporated herein by reference. Persons of ordinary skill in the art will recognize variety of alternative implementations of decoder 660 in accordance with the requirements the V.34 recommendation. In addition, persons of ordinary skill in the art will recognize a variety of alternative configurations of decoder 660 suitable to modem implementations in accordance with other communications standards such as V.32, V.32bis, etc. Returning to V.34 modem 600 of FIG. 7, decoder 660:

1. compensates for the effect of nonlinear encoding by applying inverse nonlinear projection function to the symbols at the output of the demodulator;
2. performs linear prediction implemented as a 4-tap complex FIR filter which uses the same coefficients as the remote modem precoder. The purpose of the linear predictor (not shown) is to whiten the channel noise, thereby reducing the probability of errors;
3. performs the trellis search algorithm to determine, based on the received symbols, the best decoding decision for the current symbol;
4. performs constellation decoding;
5. performs an operation complementary to that performed by shell mapper described above with reference to encoder 620; and
6. deframes data to provide a single bit stream which is then passed (after descrambling) to receiver process 697.

Other Embodiments

Figure 8:
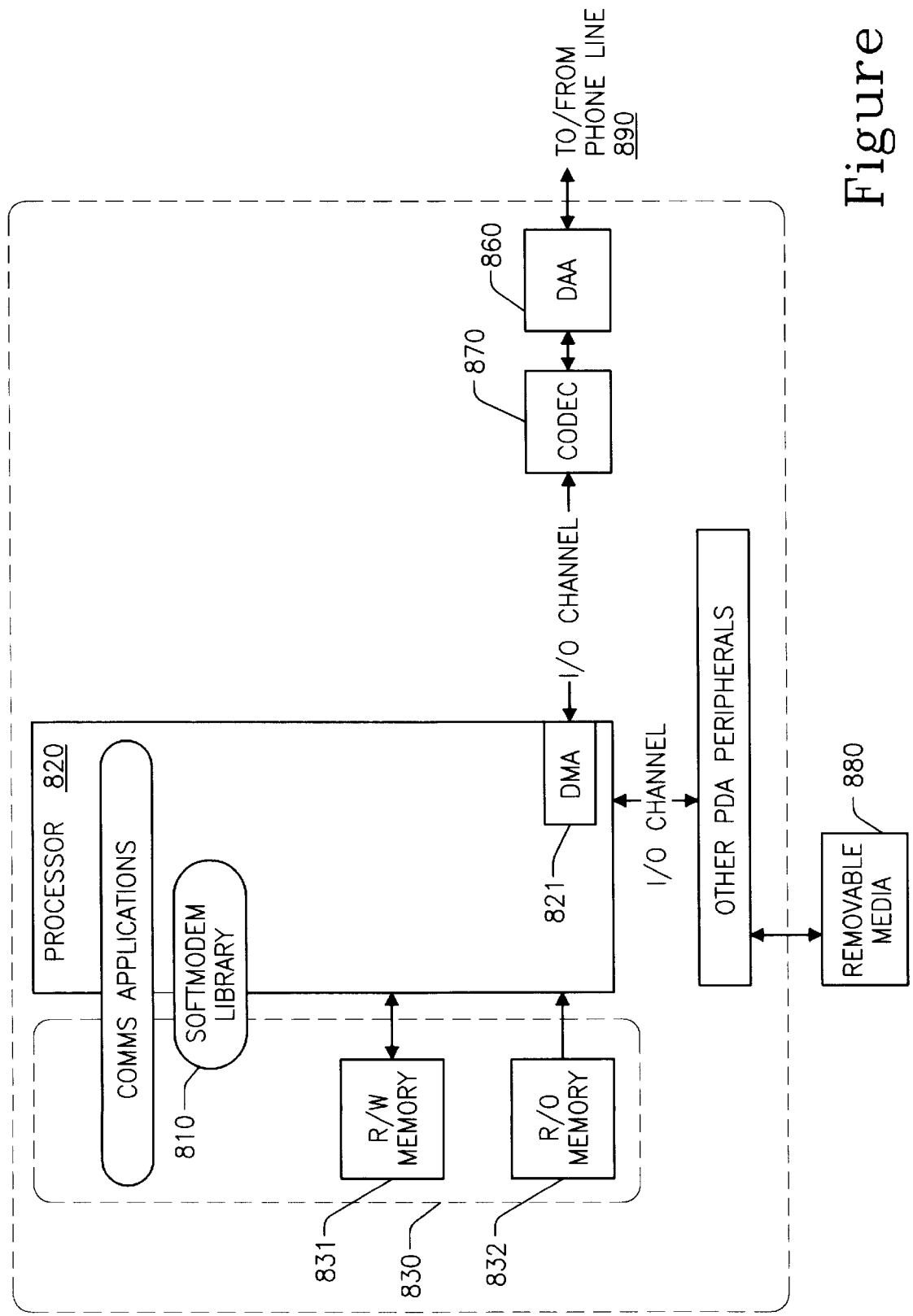
FIG. 8 is a block diagram of an exemplary Personal Digital Assistant (PDA) system embodiment including a general purpose processor, registers, and memory for executing a software implementation of a modem including half-duplex training structures and full-duplex operational structures in accordance with an exemplary embodiment of the present invention.

FIG. 8 depicts a Personal Digital Assistant (PDA) 800 incorporating a SoftModem™ library 810 including modules providing a software implementation of V.34 modem 600). In a software embodiment of V.34 modem 600, some or all of the adaptive structures of half-duplex training structure 400a and echo canceller and equalizer structure 300a are implemented using FIR filters defined by software executable on a general purpose processor. Input signal vectors and filter coefficient vectors suitable for providing the various FIR filter implementations of interpolators, phase splitting filters, linear predictors, etc. (which have been described above with reference to FIGS. 6 and 7) are loaded from memory 830 and output signal vectors are stored to memory 830. In addition, executable instructions implementing the SoftModeM™ library 810 (including implementations of phase-splitting T/3 main echo canceller 410a, complex T/3 equalizer 490a, phase splitting filter 450, phase-splitting T/3 main echo canceller 310a, and phase splitting T/3 equalizer 330a) and suitable for execution on general purpose processor 820 are also stored in, and loaded from, memory 830.

In a software embodiment of V.34 modem 600, the use of complex T/3 equalizer 490a during half-duplex training and later transitioning to phase-splitting T/3 equalizer 330a for full-duplex operations allocates a comparatively larger number of general purpose processor 820 cycles to equalizer training while providing a computationally efficient, T/3 structure for full-duplex operations. Furthermore, more general purpose processor 820 cycles are available during half-duplex training than during full-duplex operations because certain modules (e.g., encoder 620 and decoder 660) of the software implementation of V.34 modem 600 need not be executed. In addition, because cycles need not be allocated to complex T/3 equalizer 490a during phase-splitting T/3 main echo canceller 410a training (i.e., during a transmit-only phase of half-duplex training) and because cycles need not be allocated to phase-splitting T/3 main echo canceller 410a during T/3 equalizer 490a training (i.e., during a receive-only phase of half-duplex training) a comparatively larger portion of available cycles can be allocated to the training task at hand.

These advantages will be similarly applicable to an embodiment of V.34 modem 600 implemented using instructions on a DSP. In addition, improved equalizer convergence during half-duplex training and the decoupling of main echo canceller training from equalizer training are advantageous even for a full custom circuitry implementation of V.34 modem 600.

In an exemplary software embodiment, general purpose processor 820 includes an R3000 RISC microprocessor, although a wide variety of alternative processor implementations are also suitable. General purpose processor 820 includes a DMA channel 821 for interfacing to telecommunication circuits (illustratively, phone line 890) via codec 870 and Digital-to-Analog/ Analog-to-Digital (DAA) converter 860. Of course, memory 830 may include either read/write memory 831 or read/write memory 831 in combination with read-only memory 832. Persons of ordinary skill in the art will recognize a variety of suitable allocations of code and data to each. Removable media 880 provides a mechanism for supplying the executable instructions implementing SoftMode™ library 810.

While the invention has been described with reference to various embodiments, it will be understood that these embodiments are illustrative and that the scope of the invention is not limited to them. Many variations, modifications, additions, and improvements of the embodiments described are possible. For example, the structures of FIGS. 1–7 may be suitably implemented in custom circuitry, using a programmed custom (or commercially-available) DSP, as software executable on a general purpose processor, or as any combination thereof. Structures and functionality presented as hardware in an exemplary embodiment may be implemented as software, firmware, or microcode in alternative embodiments. Alternative embodiments may exploit differing echo canceller and equalizer implementations while still providing adaptive structures for half-duplex training with desirable convergence properties and/or decoupled training in conjunction with a transformation to a computationally more efficient adaptive structure for full-duplex operations. These and other variations, modifications, additions, and improvements may fall within the scope of the invention as defined in the claims which follow.

What is claimed is:

1. A method for training echo canceller and equalizer structures of a modem having transmit and receive paths, the method comprising the steps of:

providing a half duplex training structure including:
an adaptive phase-splitting echo canceller coupled to receive transmit-path samples;
a phase splitting filter coupled to receive receive-path samples; and
an adaptive complex equalizer coupled to the phase-splitting echo canceller and the phase splitting filter to receive a first difference between outputs thereof;

training the phase-splitting echo canceller using the first difference;

decoupling the complex equalizer from the transmit path and thereafter training the complex equalizer using a second difference between an output of the complex equalizer and a reference; and convolving the trained phase-splitting echo canceller with the trained complex equalizer and convolving the phase splitting filter with the trained complex equalizer to define a trained full-duplex structure, the trained full-duplex structure including:
   a trained phase-splitting echo canceller coupled to receive transmit-path samples; and
   a trained phase-splitting equalizer coupled to receive receive-path samples.

2. A method as recited in claim 1,
wherein phase-splitting echo canceller training is performed during a transmit-only phase of modem training; and
wherein complex equalizer training is performed during a receive-only phase of modem training.

3. A method as recited in claim 1, further comprising the step of:
   continuing, after the convolving steps, to train the trained phase-splitting echo canceller and the trained phase-splitting equalizer during a full-duplex phase of modem training.

4. A method as recited in claim 1, further comprising the step of:
   receiving data using the trained phase-splitting echo canceller and the trained phase-splitting equalizer to compensate for communications channel impairments.

5. A method as recited in claim 1, wherein the trained phase-splitting echo canceller and the trained phase-splitting equalizer defined by the convolving steps are adaptive structures.

6. A method as recited in claim 1, wherein the trained phase-splitting echo canceller and the trained phase-splitting equalizer defined by the convolving steps are fractionally-spaced structures.

7. A method as recited in claim 1, wherein the trained phase-splitting echo canceller and the trained phase-splitting equalizer defined by the convolving steps are adaptive T/3 structures.

8. The method of claim 1 wherein the complex equalizer, the trained phase-splitting echo canceller, and the trained phase-splitting equalizer downsample by an integer amount.

9. The method of claim 1 represented as instructions executable on a general purpose processor and encoded in a machine readable medium.

10. The method of claim 1 represented as digital signal processor (DSP) instructions executable on a DSP.

11. The method of claim 1 wherein at least one of the adaptive phase-splitting echo canceller, the phase splitting filter, the adaptive complex equalizer, the trained phase-splitting echo canceller, and the trained phase-splitting equalizer comprise instructions executable on a general purpose processor and encoded in a machine readable medium.

12. A method for training a modem having a receive path, the method comprising:
   providing a half duplex training structure including:
      a phase splitting filter coupled to receive receive-path samples; and
      an adaptive complex equalizer coupled to receive an output of the phase splitting filter;
   training the complex equalizer using a difference between an output of the complex equalizer and a reference; and
   convolving the phase splitting filter with the trained complex equalizer to define a trained phase-splitting equalizer coupled to receive receive-path samples.

13. The method of claim 12, wherein the method further includes:
   receiving data in steady-state half-duplex mode using the trained phase-splitting equalizer to compensate for communications channel impairments.

14. The method of claim 12,
wherein the modem has a transmit path;
wherein providing further includes providing an adaptive phase-splitting echo canceller coupled to receive transmit-path samples;
wherein the adaptive complex equalizer is further coupled to receive a first difference between an output of the phase-splitting echo canceller and the output of the phase splitting filter; and
wherein the method further includes:
   training the phase-splitting echo canceller using the first difference;
   decoupling the complex equalizer from the adaptive phase-splitting echo canceller prior to the complex equalizer training; and
   convolving the trained phase-splitting echo canceller with the trained complex equalizer to define a trained phase-splitting echo canceller coupled to receive transmit-path samples.

15. The method of claim 14, wherein the method further includes:
   receiving data in steady-state full-duplex mode using the trained phase-splitting equalizer to compensate for communications channel impairments.

16. A modem having transmit and receive paths and comprising:
   a phase splitting filter coupled into the receive path;
   a first phase splitting T/3 echo canceller coupled between the transmit and receive paths during a transmit-only phase of half-duplex training, wherein coefficients of the first phase splitting T/3 echo canceller are updated during the transmit-only phase to minimize a first difference between outputs of the phase splitting filter and the first phase splitting T/3 echo canceller;
   a complex T/3 equalizer coupled into the receive path during a receive-only phase of half-duplex training, wherein coefficients of the complex T/3 equalizer are updated during the receive-only phase to minimize a second difference between the output of the complex T/3 equalizer and a reference;
   a second phase splitting T/3 echo canceller coupled into the receive path during full-duplex operations, the second phase splitting T/3 echo canceller defined by convolution of respective coefficients of the first phase splitting T/3 echo canceller and the complex T/3 equalizer coincident with a cut-over to full-duplex operations; and
   a phase-splitting T/3 equalizer coupled into the receive path during full-duplex operations, the phase-splitting T/3 equalizer defined by convolution of respective coefficients of the phase splitting filter and the complex T/3 equalizer coincident with the cut-over to full-duplex operations.

17. A modem as recited in claim 16,
wherein the complex T/3 equalizer converges faster than the phase splitting T/3 equalizer, thereby improving convergence performance during half-duplex training; and
wherein the phase splitting T/3 equalizer is computationally more efficient than the complex T/3 equalizer, thereby imposing a lower computational load during full-duplex operations.

18. A modem as recited in claim 16, wherein the fractionally-spaced phase splitting echo canceller is already trained at cut-over to full-duplex operations.

19. The modem of claim 17,
wherein the phase splitting T/3 echo canceller and the phase splitting T/3 equalizer are each represented using instructions executable on a general purpose processor and encoded in a machine readable medium; and
wherein computational efficiency of the phase splitting T/3 echo canceller and the phase splitting T/3 equalizer allow processing bandwidth of the general purpose processor to be shared with application programs.

20. The modem of claim 16 wherein the phase splitting filter, the first and the second phase splitting T/3 echo cancellers, the phase splitting T/3 equalizer, and the complex T/3 equalizer are each represented as discrete time filters using instructions executable on a processor and encoded in a machine readable medium.

21. The modem of claim 20, wherein the processor includes a general purpose processor, processing bandwidth of which is allocable to the discrete time filters and to application programs.

22. The modem of claim 20, wherein the processor includes a digital signal processor (DSP).

23. An apparatus comprising:
a half-duplex training structure comprising:
adaptive phase-splitting fractionally-spaced echo canceller means;
phase splitting filter means; and
adaptive complex fractionally-spaced equalizer means;
means for training the adaptive phase-splitting fractionally-spaced echo canceller means during a transmit only phase of half-duplex training;
means for training the adaptive complex fractionally-spaced equalizer means during a receive only phase of half-duplex training; and
means for converting the half-duplex training structure to a full-duplex structure, the converting means:
convolving trained coefficients of the adaptive phase-splitting fractionally-spaced echo canceller means with trained coefficients of the adaptive complex fractionally-spaced equalizer means to define trained fractionally-spaced phase-splitting echo canceller means; and
convolving trained coefficients of the phase splitting filter means with trained coefficients of the adaptive complex fractionally-spaced equalizer to define trained phase-splitting fractionally-spaced equalizer means.

24. An apparatus, as recited in claim 23, further comprising:
a processor; and
machine readable storage,
at least one of the adaptive phase-splitting fractionally-spaced echo canceller means, the phase splitting filter means, the adaptive complex fractionally-spaced equalizer means, the adaptive phase-splitting fractionally-spaced echo canceller training means, the adaptive complex fractionally-spaced equalizer training means, the converting means, the trained fractionally-spaced phase-splitting echo canceller means; and the trained phase-splitting fractionally-spaced equalizer means, comprising instructions stored in the machine readable storage and executable on the processor.

25. An apparatus, as recited in claim 23, encoded in a computer readable medium as instructions executable on a processor.

26. A method for providing fast convergence during training of a modem while limiting steady-state computational load of said modem, said method comprising:
training a precursor training structure having improved convergence characteristics as compared to a phase-splitting equalizer;
after training, transforming from the precursor training structure to a receive path structure including the phase-splitting equalizer structure by convolving filters of the precursor training structure to define the phase-splitting equalizer; and
thereafter receiving samples using the receive path structure.

27. A method, as recited in claim 26, wherein the precursor training structure comprises:
a phase-splitting filter coupled to receive receive-path samples; and
an adaptive complex equalizer coupled to receive an output of the phase-splitting filter.

28. A method, as recited in claim 26, wherein the precursor training structure comprises:
an adaptive phase-splitting echo canceller coupled to receive transmit-path samples;
a phase-splitting filter coupled to receive receive-path samples; and
an adaptive complex equalizer coupled to the phase-splitting echo canceller and the phase-splitting filter to receive a first difference between outputs thereof.

29. A method, as recited in claim 28, wherein the training comprises:
first training the phase-splitting echo canceller using the first difference;
after the first training, decoupling the complex equalizer from the transmit path; and
thereafter second training the complex equalizer using a second difference between an output of the complex equalizer and a reference.

30. A method, as recited in claim 26, wherein the training includes training a complex equalizer of the precursor training structure using a difference between an output of the complex equalizer and a reference.

31. A method, as recited in claim 26,
wherein the precursor training structure is a half-duplex training structure; and
wherein the receive path structure is a trained full-duplex structure.

32. A method, as recited in claim 26,
wherein the precursor training structure is a half-duplex training structure; and
wherein the receive path structure is a trained half-duplex structure.

33. A method, as recited in claim 26,
wherein the receive path structure is a full-duplex structure; and
wherein the filter convolving comprises:
convolving a trained phase-splitting echo canceller of the precursor training structure with a trained complex equalizer of the precursor training structure to define a trained phase-splitting echo canceller of the full-duplex receive path structure; and convolving a fixed phase-splitting filter of the precursor training structure with the trained complex equalizer to define a trained phase-splitting equalizer of the full-duplex receive path structure.

34. A method, as recited in claim 26, wherein the receive path structure is a half-duplex structure; and wherein the filter convolving comprises convolving a fixed phase-splitting filter of the precursor training structure with a trained complex equalizer of the precursor training structure to define a trained phase-splitting equalizer of the half-duplex receive path structure.

* * * * *